United States Patent
Ding

(10) Patent No.: US 12,530,711 B2
(45) Date of Patent: Jan. 20, 2026

(54) PRODUCT RECOMMENDATION METHOD AND APPARATUS, COMPUTER STORAGE MEDIUM, AND SYSTEM

(71) Applicants: CHINA MOBILE (SUZHOU) SOFTWARE TECHNOLOGY CO., LTD., Jiangsu (CN); CHINA MOBILE COMMUNICATIONS GROUP CO., LTD., Beijing (CN)

(72) Inventor: Qianjin Ding, Suzhou (CN)

(73) Assignees: CHINA MOBILE (SUZHOU) SOFTWARE TECHNOLOGY CO., LTD., Jiangsu (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 308 days.

(21) Appl. No.: 18/254,922

(22) PCT Filed: Oct. 13, 2021

(86) PCT No.: PCT/CN2021/123471
§ 371 (c)(1),
(2) Date: May 30, 2023

(87) PCT Pub. No.: WO2022/111095
PCT Pub. Date: Jun. 2, 2022

(65) Prior Publication Data
US 2024/0013280 A1    Jan. 11, 2024

(30) Foreign Application Priority Data
Nov. 30, 2020    (CN) .......................... 202011381065.7

(51) Int. Cl.
*G06Q 30/00*    (2023.01)
*G06Q 30/0601*    (2023.01)

(52) U.S. Cl.
CPC .............................. *G06Q 30/0631* (2013.01)

(58) Field of Classification Search
CPC ................................................ G06Q 30/06–08
See application file for complete search history.

(56) References Cited

U.S. PATENT DOCUMENTS

2016/0274744 A1*  9/2016  Neumann ........ H04N 21/47202
2018/0108048 A1*  4/2018  Yoon .................. G06Q 30/0271
(Continued)

FOREIGN PATENT DOCUMENTS

CN    103823908 A    5/2014
CN    104657336 A    5/2015
(Continued)

OTHER PUBLICATIONS

International Search Report in the international application No. PCT/CN2021/123471, mailed on Dec. 23, 2021. 2 pages.
(Continued)

*Primary Examiner* — Ethan D Civan
(74) *Attorney, Agent, or Firm* — Cooper Legal Group, LLC

(57) ABSTRACT

Provided are a product recommendation method and apparatus, a computer storage medium, and system. The method comprises: determining a target product potential expectation value and a target gradient value of a target user; on the basis of the target product potential expectation value and the target gradient value, determining a similar user set; in the similar user set, acquiring a plurality of gradient values corresponding to a plurality of products to be recommended for each user, and composing a similar user gradient value set by using the plurality of gradient values; and determining at least one recommended gradient value from the similar user gradient value set, and recommending at least one
(Continued)

product to be recommended corresponding to at least one recommended gradient value to the target user.

17 Claims, 6 Drawing Sheets

(56) References Cited

U.S. PATENT DOCUMENTS

2019/0349619 A1\* 11/2019 Hou .................. G06N 3/08
2020/0126035 A1\* 4/2020 Zeng ............. G06Q 30/0251

FOREIGN PATENT DOCUMENTS

| CN | 106997358 A | 8/2017 |
| CN | 109543840 A | 3/2019 |
| CN | 110969516 A | 4/2020 |
| KR | 20130044931 A | 5/2013 |
| WO | 2014175631 A1 | 10/2014 |
| WO | 2015129988 A1 | 9/2015 |

OTHER PUBLICATIONS

English translation of the Written Opinion of the International Search Authority in the international application No. PCT/CN2021/123471, mailed on Dec. 23, 2021. 4 pages.

\* cited by examiner

PRODUCT RECOMMENDATION METHOD AND APPARATUS, COMPUTER STORAGE MEDIUM, AND SYSTEM

CROSS-REFERENCE TO RELATED APPLICATIONS

This application claims priority to Chinese Patent application filed to China National Intellectual Property Administration (CNIPA) on Nov. 30, 2020 with an application number of 202011381065.7 and entitled "PRODUCT RECOMMENDATION METHOD AND APPARATUS, COMPUTER STORAGE MEDIUM, AND SYSTEM", the contents of which are hereby incorporated by reference in its entirety.

TECHNICAL FIELD

The disclosure relates to the technical field of computers, and in particular to a product recommendation method and apparatus, a computer storage medium, and a system.

BACKGROUND

With the development of Internet and information technologies, data information has changed from a deficient era to a big data era, both data producer and data consumer have huge demands on information hidden behind the data, the producer needs to filter out correlation between different information according to the data, and the consumer needs to push personalized information or suggestions to the producer. In this context, generation of a recommendation system meets demands of the two parties, and the system may help a user to filter or recommend useful information according to the data, and help the user to improve data processing efficiency, and a product recommendation system has been successfully applied on an e-commerce platform. However, the recommendation method in the related art still has many drawbacks, and cannot accurately recommend products of interest to the user.

SUMMARY

The disclosure provides a product recommendation method and apparatus, a computer storage medium, and a system, which are capable of analyzing a change trend of products preferred by a user, and providing a more accurately recommended product to a target user.

Technical solutions of embodiments of the disclosure are implemented as follows.

According to a first aspect, an embodiment of the disclosure provides a product recommendation method, including the following operations.

A target product potential expectation value and a target gradient value of a target user are determined, here, the target product potential expectation value indicates a favorite comprehensive value of the target user to multiple products, and the target gradient value represents a change trend of a favorite degree of the target user to a target product.

A similar user set is determined based on the target product potential expectation value and the target gradient value.

Multiple gradient values of each user corresponding to multiple to-be-recommended products are acquired from the similar user set, and a similar user gradient value set is formed by the multiple gradient values.

At least one recommended gradient value is determined from the similar user gradient value set, and at least one to-be-recommended product corresponding to the at least one recommended gradient value is recommended to the target user.

According to a second aspect, the disclosure provides a product recommendation apparatus, including an acquisition unit, a screening unit, a collection unit and a recommendation unit.

The acquisition unit is configured to determine a target product potential expectation value and a target gradient value of a target user, here, the target product potential expectation value indicates a favorite comprehensive value of the target user to multiple products, and the target gradient value represents a change trend of a favorite degree of the target user to a target product.

The screening unit is configured to determine a similar user set based on the target product potential expectation value and the target gradient value.

The collection unit is configured to acquire, from the similar user set, multiple gradient values of each user corresponding to multiple to-be-recommended products, and form a similar user gradient value set by the multiple gradient values.

The recommendation unit is configured to determine at least one recommended gradient value from the similar user gradient value set, and recommend at least one to-be-recommended product corresponding to the at least one recommended gradient value to the target user.

According to a third aspect, the disclosure provides a product recommendation apparatus, including a memory and a processor.

The memory is configured to store a computer program executable on the processor.

The processor is configured to execute operations of the method according to the first aspect when the processor runs the computer program.

According to a fourth aspect, the disclosure provides a computer storage medium, having stored thereon a product recommendation program, and the product recommendation program implements operations of the method according to the first aspect when the product recommendation program is executed by at least one processor.

According to a fifth aspect, the disclosure provides a product recommendation system, including at least the product recommendation apparatus according to the second aspect or the third aspect.

The embodiments of the disclosure provide a product recommendation method and apparatus, a computer storage medium, and a system. The method includes the following operations. A target product potential expectation value and a target gradient value of a target user are determined, here, the target product potential expectation value indicates a favorite comprehensive value of the target user to multiple products, and the target gradient value represents a change trend of a favorite degree of the target user to a target product. A similar user set is determined based on the target product potential expectation value and the target gradient value. Multiple gradient values of each user corresponding to multiple to-be-recommended products are acquired from the similar user set, and a similar user gradient value set is formed by the multiple gradient values. At least one recommended gradient value is determined from the similar user gradient value set, and at least one to-be-recommended product corresponding to the at least one recommended gradient value is recommended to the target user. In this way, a change trend of products preferred by the target user may be analyzed by using the target product potential expectation value and the target gradient value, so that the similar user set having a similarity with the target user is acquired, and a recommended product may be provided to the target user according to the similar user set. Furthermore, since the recommended product as provided is obtained according to the change trend of products preferred by the user, the recommended product recommended to the user conforms to the user's preference better and has higher accuracy.

DETAILED DESCRIPTION

Figure 1:
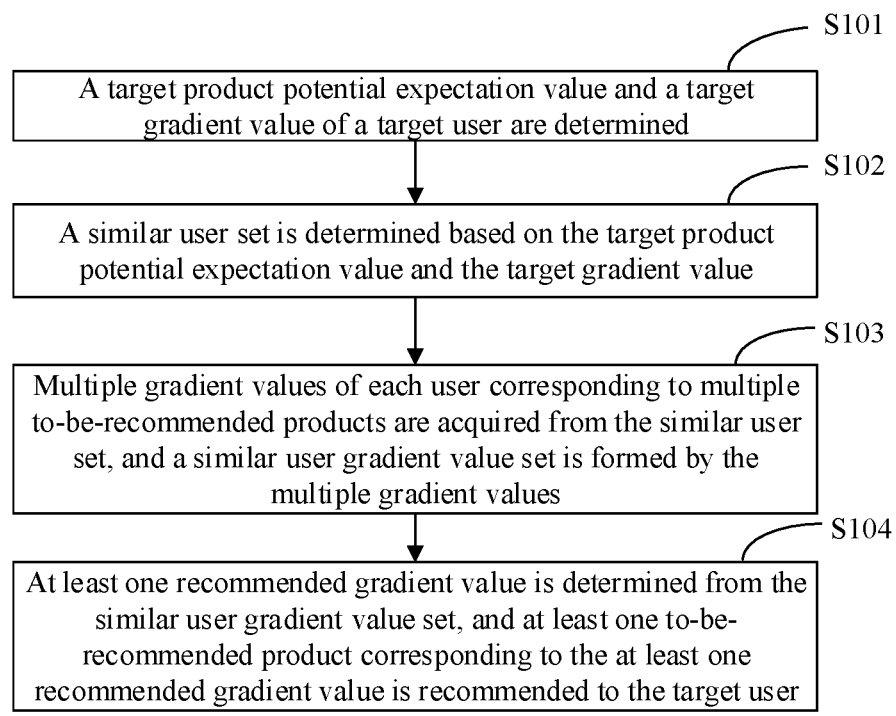
FIG. 1 is a schematic flowchart of a product recommendation method according to an embodiment of the disclosure.

The technical solutions in the embodiments of the disclosure will be clearly and completely described below with reference to the drawings in the embodiments of the disclosure.

With the development of Internet and information technologies, data information has changed from a deficient era to a big data era, both data producer and data consumer have huge demands on information hidden behind the data, the producer needs to filter out correlation between the information according to the data, and then provides a reasonable establishment to the consumer. In this context, generation of a recommendation system meets demands of the two parties, and the system may help a user to filter or recommend useful information according to the data, and help the user to improve data processing efficiency, and the recommendation system has been successfully applied on an e-commerce platform.

At present, commonly used recommendation systems use a popularity-based algorithm, a Collaborative Filtering (CF)-based algorithm, a content-based algorithm, and a model-based algorithm. The popularity-based algorithm is the simplest recommendation algorithm, and recommends data to the user according to popularity ranking of the data, for example, hot news, a number of commonly used shares, a number of comments, or the like are used as reference indexes. The CF-based algorithm is a commonly used algorithm, and includes a user-based CF algorithm and an item-based CF algorithm. The content-based algorithm is established on information contents, performs feature extraction on the contents, and performs recommendation according to contents of interest of the user. The model-based algorithm is trained offline and performs recommendation online, and commonly used models include a decision tree, a neural network, a Bayesian classification, or other models.

The two algorithms of the CF-based algorithm have substantially the same idea, except that reference contents selected by the two algorithms are different. The user-based CF algorithm mainly searches a user set corresponding to user types, and recommends contents to the user according to favorites of users in the set and information not found or searched by a target user; and the item-based CF algorithm performs recommendation mainly based on historical items of the user and according to an item similarity, and the similarity may reflect a relationship between the information to a certain extent, to achieve a correct theoretical result. However, a change trend of the user or item similarity is not considered in these algorithms, which causes that the system cannot achieve accurate positioning during recommendation at a certain stage, for example, a similarity between a user 1 and a user 2 is high at a certain stage, while change trends of the user 1 and the user 2 present a negative correlation situation, but at this time, the system still considers that the user 1 and the user 2 are the same, which causes that a recommended information or article has a certain degree of error; on the contrary, in the system, the user 1 and a user 3 do not have similarity there-between at this time, while change trends of the user 1 and the user 3 present a positive correlation situation, and information or articles in which the user 1 and the user 3 are interested are the same actually, but the system gives different recommendation results.

An embodiment of the disclosure provides a product recommendation method. Basic idea of the method is: determining a target product potential expectation value and a target gradient value of a target user, here, the target product potential expectation value indicates a favorite comprehensive value of the target user to multiple products, and the target gradient value represents a change trend of a favorite degree of the target user to a target product; determining a similar user set based on the target product potential expectation value and the target gradient value; acquiring, from the similar user set, multiple gradient values of each user corresponding to multiple to-be-recommended products, and forming a similar user gradient value set by using the multiple gradient values; and determining at least one recommended gradient value from the similar user gradient value set, and recommending at least one to-be-recommended product corresponding to the at least one recommended gradient value to the target user. In this way, a change trend of products preferred by the target user may be analyzed by using the target product potential expectation value and the target gradient value, so that the similar user set having a similarity with the target user is acquired, and a recommended product may be provided to the target user according to the similar user set. Furthermore, since the recommended product as provided is obtained according to the change trend of products preferred by the user, the recommended product recommended to the user conforms to the user's preference better and has higher accuracy.

The embodiments of the disclosure will be described in detail below with reference to the drawings.

In an embodiment of the disclosure, with reference to FIG. 1, a schematic flowchart of a product recommendation method according to the embodiment of the disclosure is shown. As shown in FIG. 1, the method may include the following operations S101 to S104.

At S101, a target product potential expectation value and a target gradient value of a target user are determined.

It should be noted that the target product potential expectation value indicates a favorite comprehensive value of the target user to multiple products, and the target gradient value represents a change trend of a favorite degree of the target user to a target product.

It should be noted that the product recommendation method provided in the embodiment of the disclosure proposes two new concepts, that is, a product potential expectation value and a gradient value. Specifically, the product potential expectation value may be understood as a comprehensive favorite degree of the user to multiple products, and the gradient value may be understood as a change trend of a favorite degree of the user to one of the products, that is, each of the multiple products corresponds to a product potential gradient.

Here, the multiple products may be understood as a personalized product set corresponding to each user, and the personalized product set may be all products browsed by the user, all products purchased by the user, or all products collected by the user, or even all products in the system. Furthermore, the product sets corresponding to different users are different.

That is, the greater the product potential expectation value, the higher the degree of interest of the user to multiple products; and the greater the gradient value, the favorite degree of the user to the product corresponding to the gradient value is increased significantly.

It should be noted that the product potential expectation value may be specifically calculated from proportions of different products, a browsing number of the user, an index of interest of the user, a browsing number of similar products, or other aspects, as long as the degree of interest of the user to multiple products may be measured.

It should also be noted that in a specific implementation, the target gradient value may be calculated by a formula as follows: the target gradient value=(a change amount of the product potential expectation value)/(a change amount of the favorite degree of the target product), here, the favorite degree of the target product may be represented by a penalty factor. That is, the target gradient value needs to be calculated according to the product potential expectation value before the change and the product potential expectation value after the change. Here, with respect to the target gradient value, the target product potential expectation value is equivalent to "the product potential expectation value after the change". For example, product potential expectation values of the target user A are $E_1 \ldots E_{n-1}$, $E_n$, respectively according to different time points, then the target product potential expectation value is $E_n$, and the target gradient value $T_n$ characterizes the change trend of the favorite degree of the target user to the target product in a process from $E_{n-1}$ to $E_n$.

It should be noted that each product in a product group corresponding to each user corresponds to a gradient value at different times. In the embodiment of the disclosure, the target product is taken as a reference, the target gradient value as used refers to a gradient value corresponding to the target product, and the target product may be a preset product, or a latest product operated by the target user, such as a product clicked by the user, a product collected by the user, a product browsed by the user, or the like.

It should also be noted that in order to facilitate calculation of the product potential expectation value, a reference frame is uniformly established for each user, a new user (without any historical information) may be used as a reference frame of all users, and the new user may be a virtual user or any real user, as long as it is ensured that the new user does not have any historical information. In this way, an initial product potential expectation value of each user is the same. Then, after the user's operation, the product potential expectation value corresponding to the user may be calculated according to the reference frame and historical information newly added by the user.

Figure 2:
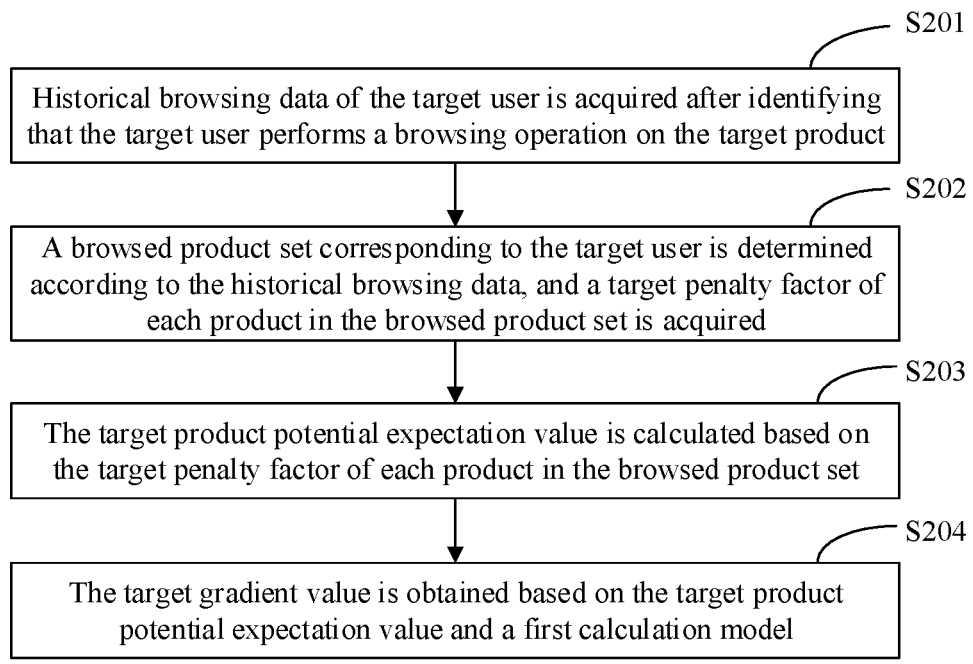
FIG. 2 is a schematic flowchart of another product recommendation method according to an embodiment of the disclosure.

The product potential expectation value may be calculated according to weights of different products and favorite degrees of the target user to different products. Therefore, in another embodiment of the disclosure, with reference to FIG. 2, a schematic flowchart of another product recommendation method according to the embodiment of the disclosure is shown. As shown in FIG. 2, the operation of determining the target product potential expectation value and the target gradient value of the target user may include the following operations S201 to S204.

At S201, historical browsing data of the target user is acquired after identifying that the target user performs a browsing operation on the target product.

It should be noted that historical browsing data of the target user is acquired after identifying that the target user performs the browsing operation on the target product, and the historical browsing data is configured to indicate browsing data of the target user to multiple products.

It should also be noted that the target product may be set in form of a preset product, or may be determined according to the browsing operation. That is, the preset product may be set in advance, and the operation of acquiring the historical browsing data may be triggered only when the target user browses the preset product as set, and the preset product becomes the target product at this time. Furthermore, the operation of acquiring the historical browsing data may also be triggered according to each browsing operation of the target user, so that each browsing operation of the target user may correspond to a target product, and the operation of acquiring the historical browsing data is triggered.

At S202, a browsed product set corresponding to the target user is determined according to the historical browsing data, and a target penalty factor of each product in the browsed product set is acquired.

It should be noted that the browsed product set includes the target product, and the target penalty factor is configured to characterize a favorite degree of a user to a product.

A product set browsed by the target user, i.e., the browsed product set (equivalent to the foregoing product pool) is determined according to the historical browsing data. Furthermore, the target penalty factor of each product in the browsed product set is determined according to the browsing operation of the target user on each product. Furthermore, the operation of the target user may cause change of a penalty factor of each product, and therefore the target penalty factor represents a penalty factor calculated according to the acquired historical browsing data.

Specifically, the penalty factor may be calculated according to a browsing number of the user on the product. Therefore, in some embodiments, the operation of determining the target penalty factor of each product in the browsed product set may include the following operations.

A browsing frequency (i.e., a count or number of times of the browsing operations performed within a period of time) corresponding to each product in the browsed product set is determined according to the historical browsing data, and a total browsing frequency corresponding to the browsed product set is determined.

A ratio of the browsing frequency corresponding to each product to the total browsing frequency is calculated, and the calculated ratio is determined as the target penalty factor of each product.

It should be noted that the browsing frequency corresponding to each product is determined from the historical browsing data of the target user, by taking all products browsed by the target user (i.e., the browsed product set) as objects, and the total browsing frequency corresponding to all products is determined. When a browsing frequency of the target user on a certain product is large, it may be considered that the favorite degree of the target user to the product is greater. Therefore, the target penalty factor of each product may be calculated according to the browsing frequency corresponding to each product.

Exemplarily, the penalty factor may represent a ratio of a frequency of a user browsing the product to a frequency of the user browsing all products. Assuming that the frequency of the user browsing a product A is number, and the frequency of the user browsing all products in the browsed product set is sum, then the penalty factor of the user to the browsed product is number/sum. That is, the higher the penalty factor, the more the user likes the product.

At S203, the target product potential expectation value is calculated based on the target penalty factor of each product in the browsed product set.

It should be noted that the target product potential expectation value may be calculated according to the target penalty factor of each product.

It should also be noted that each product in the historical browsing data of the target user may be numerous and come from different categories, which results in excessive calculation amounts in the entire processing process. Therefore, the product potential expectation value may be refined to a specific product category, to reduce processing amounts. Therefore, in some embodiments, the operation of calculating the target product potential expectation value based on the target penalty factor of each product in the browsed product set may include the following operations.

A weight value of each product in the browsed product set is acquired.

The target product potential expectation value is obtained by a second calculation model according to the weight value of each product in the browsed product set and the target penalty factor of each product in the browsed product set.

It should also be noted that the weight value of the product may be understood as a proportion of the product to all products. Specifically, a target product expectation value is calculated by using a first calculation model according to the weight value of each product and the target penalty factor.

Exemplarily, the second calculation model may be shown in formula (1):

$$UP = \sum_{i \in R} Item_i * C_i \quad (1)$$

Here, UP is a product expectation value, $Item_i$ represents a weight or proportion of a product i in the category, $C_i$ represents a penalty factor of the product i, and $$\sum_{i \in R} C_i = 1,$$

and R is the browsed product set.

It should also be noted that in order to facilitate shopping of the user, products may be classified usually according to categories, such as clothing, digital product, beauty makeup, or the like. On this basis, multiple products belonging to the same category as the target product may be selected from the historical browsing data, thereby forming the browsed product set. In this way, not only calculation amounts during processing are reduced, but also data of products in a category relatively completely reflects features of interest of the user. Therefore, all products are classified according to multiple preset categories, a category corresponding to the target product is taken as a target preset category, and products browsed by the target user and belonging to the same category as the target product are screened out according to the historical browsing data, to form the browsed product set.

Exemplarily, the preset category includes clothing and digital product, the target user browses women's clothing A, a mobile phone B, men's clothing C and a computer D, and when the target product is men's clothing C, the browsed product set includes women's clothing A and men's clothing C; and when the target product is the computer D, the browsed product set includes the mobile phone B and the computer D.

It should be noted that as to each product in the browsed product set, a proportion, i.e., a weight value of each product among products in the same category is determined. That is, the weight value of each product is intended to indicate the proportion of each product among products in the same category.

Exemplarily, it is assumed that the target preset category is clothing, there are a total of 10000 products (including repeated products, for example, two merchants operate the product A, then the product A is considered as two products) in the clothing category, and the browsed product set is {women's clothing A, men's clothing C}, here, two different merchants operate the product A, then a weight value of women's clothing A is $1/5000$, and only one merchant operates men's clothing C, then a weight value of men's clothing C is $1/10000$.

In this way, the target product potential expectation value may be calculated by using the historical browsing data and the target product.

At S204, the target gradient value is obtained based on the target product potential expectation value and a first calculation model.

It should be noted that after the target product potential expectation value is obtained, the target gradient value may be calculated according to the target product potential expectation value.

In the embodiment of the disclosure, the gradient value is calculated according to a change amount of the product potential expectation value, and therefore the gradient value may be calculated only by using two different product potential expectation values. Therefore, in some embodiments, the operation of obtaining the target gradient value based on the target product potential expectation value and the first calculation model may include the following operations.

A pre-browsing product potential expectation value of the target user is acquired, and a subtraction operation is performed between the target product potential expectation value and the pre-browsing product potential expectation value, to obtain a product potential expectation difference.

A pre-browsing penalty factor and a target penalty factor corresponding to the target product are acquired, and a subtraction operation is performed between the target penalty factor and the pre-browsing penalty factor, to obtain a penalty factor difference.

A ratio of the product potential expectation value to the penalty factor difference is calculated, to obtain the target gradient value of the target user.

It should be noted that the pre-browsing product potential expectation value refers to a product potential expectation value corresponding to the target user at the target preset category before the browsing operation is performed on the target product. The pre-browsing penalty factor refers to a penalty factor of the target user with respect to the target product before the browsing operation is performed on the target product. Furthermore, when the target user does not browse the target product before the browsing operation is performed on the target product, it may be considered that the pre-browsing penalty factor of the target product is 0.

Specific operations of calculating the target gradient value are as follows:

(1) subtracting the pre-browsing product potential expectation value from the target product potential expectation value, to obtain the product potential expectation difference;
(2) subtracting the pre-browsing penalty factor from the target penalty factor, to obtain the penalty factor difference; and
(3) calculating the target gradient value of the target user by using the second calculation model according to the product potential expectation value and the penalty factor difference.

That is, the first calculation model is shown in formula (2):

$$g=|UP'-UP|(C'_i-C_i) \qquad (2)$$

Here, UP' is the target product potential expectation value, UP is the pre-browsing product potential expectation value, $C'_i$ is a target penalty factor of a product i, and $C_i$ is a pre-browsing penalty factor of the product i.

In this way, the target product potential expectation value and the target gradient value of the target user may be calculated for the browsing operation of the target user on the target product, to screen out a user group similar to the target user according to the target product potential expectation value and the target gradient value, thereby determining a product recommended to the target user.

According to the product recommendation method provided by the embodiment of the disclosure, specific implementations of the above-mentioned embodiments are described in the embodiment in detail, and it may be seen therefrom that the change trend of products preferred by the target user may be analyzed by using the target product potential expectation value and the target gradient value, so that the similar user set having a similarity with the target user is acquired, and a more accurately recommended product is provided to the target user according to the similar user set.

At S102, a similar user set is determined based on the target product potential expectation value and the target gradient value.

It should be noted that the target product potential expectation value and the target gradient value may reflect some features of the target user in aspects of favorite products. Specifically, when there is a preset category classification, the target product potential expectation value may reflect an overall favorite degree of the target user to products in the preset category, and the target gradient value reflects an influence degree of the latest product browsed by the target user on the product potential expectation value.

Therefore, the similar user set similar to the target user may be screened out according to the target product potential expectation value and the target gradient value. Generally speaking, the target user and users in the similar user set present the same preference degree to a certain type of products, therefore users in this group have similarity therebetween.

Furthermore, in some embodiments, the operation of determining the similar user set based on the target product potential expectation value and the target gradient value may include the following operations.

A similar product potential expectation range is determined according to the target product potential expectation value and a first preset confidence interval.

Multiple first users are determined based on the similar product potential expectation range, here, product potential expectation values of the first users are within the similar product potential expectation range.

A similar gradient value range is determined based on the target gradient value and a second preset confidence interval.

Multiple second users are determined from the multiple first users based on the similar gradient value range, and the multiple second users are determined as the similar user set, here, gradient values of the second users for the target product are within the similar gradient value range.

It should be noted that the similar product potential expectation range is determined according to an equipotential line of the target product potential expectation value and the preset confidence interval. Exemplarily, the preset confidence interval may be understood as a floating percentage, and assuming that the target product potential expectation value is 100 and the preset confidence interval is 5%, then the similar product potential expectation range is 95-105. Each of all users whose product potential expectation values are within the similar product potential expectation range is the first user.

It should also be noted that for each user, different product potential expectation values correspond to the user over time, and a product potential expectation value may also be provided to the same user in each preset category. Here, a preset screening rule may be understood as screening from latest product potential expectation values of each user corresponding to the target preset category. That is, the first user is most recently similar to the product potential expectation value of the target user in the target preset category.

Multiple second users which are similar to the target gradient value with respect to a gradient value of the target product, are selected from multiple first users. Specific process thereof is similar to the process of determining the first users, that is, a gradient value of each of the first users for the target product is determined first, and when a difference between the gradient value of one of the first users for the target product and the target gradient value is within an acceptable range (i.e., the second preset confidence interval), the first user may be determined as the second user.

It should also be noted that multiple determined first users do not necessarily have gradient values stored for the target product. Then, the gradient value of the first user for the target product may be calculated by taking the target product as an object, according to the historical data corresponding to the first user, and according to two latest product potential expectation values of the first user, so that the gradient value is compared with the target gradient value, to implement screening.

At present, a gradient value for each product may also be recorded in real time according to real-time operations of each user, however, there are large calculation amounts by doing so.

In this way, the similar user set having a certain similarity with the target user may be screened out according to the target product potential expectation value and the target gradient value.

At S103, multiple gradient values of each user corresponding to multiple to-be-recommended products are acquired from the similar user set, and a similar user gradient value set is formed by the multiple gradient values.

It should be noted that the similar user potential gradient value set includes multiple gradient values of each user in the similar user set corresponding to multiple to-be-recommended products.

It should be noted that multiple gradient values of each user in the similar user set corresponding to multiple to-be-recommended products are acquired. Here, the to-be-recommended product may be preset, or may be a latest product browsed, collected or purchased by the user in the similar user set.

Exemplarily, the target product is women's clothing A, and since product potential expectation values of user X and user Y correspond to the clothing category are similar to the target expectation value, and gradient values of the user X and the user Y corresponding to women's clothing A are similar to the target gradient value, the user X and the user Y are determined as the similar user set. Then, gradient values of the user X and the user Y for multiple browsed products (i.e., to-be-recommended products) are acquired respectively, for example, a gradient value of the user X for women's clothing B, a gradient value of the user Y for food E, a gradient value of the user X for a mobile phone F, a gradient value of the user Y for the mobile phone F, or the like.

Here, in order to reduce subsequent processing amounts, some rules may be set, so that only gradient values conforming to the rules are screened out, for example, only positive gradient values are selected (when the gradient value is positive, it indicates that the product has a positive influence on the product potential expectation value, and when the gradient value is negative, it indicates that the product has a negative influence on the product potential expectation value).

At S104, at least one recommended gradient value is determined from the similar user gradient value set, and at least one to-be-recommended product corresponding to the at least one recommended gradient value is recommended to the target user.

It should be noted that since the gradient value may indicate a change trend of a favorite degree of a user to a product, the latest product preferred by the user in the similar user set may be determined according to the gradient value. Since the similar user set has a certain similarity with the target user, the latest product preferred by the similar user may be taken as a recommended product to be recommended to the target user.

Therefore, the at least one recommended gradient value is determined according to the similar user gradient value set, and then the product corresponding to the recommended gradient value is recommended to the target user. In this way, the recommended product may be determined according to change of the latest product browsed by the target user, improving the user's experience.

Furthermore, in some embodiments, the operation of determining at least one recommended gradient value from the similar user gradient value set may include the following operations.

Multiple gradient values in the similar user gradient value set are sorted.

The at least one recommended gradient value is determined according to a result of the sorting.

It should be noted that a size of a similar user gradient value represents a preference degree of a user to a product, therefore multiple gradient values in the similar user gradient value set are sorted, and the first N gradient values are selected and determined as recommended gradient values.

Exemplarily, when the gradient value is calculated by formula (2), it may be seen that positive or negative sign of the gradient value represents that attention degree of the user to the product increases or decreases, and a magnitude of an absolute value of the gradient value represents that influence of the product on the product potential expectation value is smaller or greater. Here, the smaller the absolute value of the gradient value, the greater the influence of the product on the product potential expectation value.

Therefore, N positive gradient values with minimum absolute values are selected from multiple sorted gradient values and determined as recommended gradient values, and products corresponding to the recommended gradient values are determined as recommended products. On this basis, only those positive gradient values may also be selected when the gradient value set is formed, so that N minimum gradient values may be directly selected, which may reduce subsequent processing difficulty.

In the related art, the CF algorithm is a better choice in current product recommendation methods, however, the CF-based algorithm is mainly based on calculating similarity between users or items, and considers that there is a strong relationship between users or items with high similarity, so that information with high similarity to the current user or item is preferentially recommended when information or items are recommended, which may cause that users or items with the same similarity in a certain period are forced to tend to be consistent in future information data under influence of the recommendation system.

The CF-based algorithm is generally divided into two parts: calculating similarity, and recommending contents to the user according to the similarity; the similarity is characterized by various calculation modes at present, and various optimization modes are provided, however, a problem of single index cannot be changed by performing system calculation according to the similarity, there is a certain limitation when complex and huge information data are involved, and furthermore, time complexity is relatively high along with gradual increase of an information sample space.

With respect to these drawbacks, main contents of the product recommendation method provided in the embodiments of the disclosure include:
(1) System recommendation performed according to single dimension of the similarity cannot adapt to an actual change trend, which causes that personalized system recommendation is limited, therefore product potential and gradient concepts are proposed on this basis, and the dimension for the system recommendation is improved, so that capability of the system recommendation is enhanced;
(2) In case of a problem of high time complexity caused by the sample space, processing performance of the algorithm is improved to adapt to the increasingly huge sample space, and calculation of the product potential and gradient based on the category dimension is proposed on the basis of dimension reduction.

In summary, the embodiments of the disclosure provide a product potential-based recommendation method, key points thereof are as follows:

(1) The previous similarity is converted into the product potential expectation value and the gradient value, which is never considered and involved in previous scenarios.

(2) The previous single metric parameter is converted into a multi-dimensional parameter metric, that is, it is a concept of combining the potential energy and the gradient to be introduced into the recommendation system, which is not mentioned before.

Compared with the CF-based algorithm, the embodiments of the disclosure provide a product potential-based recommendation method, which has the following technical advantages:

(1) The CF algorithm uses a user CF algorithm and an item CF algorithm respectively, and considers that there is a strong association relationship between similar users or products according to similarity features between users and similarity features between products during execution respectively, so that a good application effect may be achieved to a certain extent. However, a single parameter is used to measure similarity between users and similarity between products, and problems such as dynamic changes and change trends between similarities, or the like are not considered, which causes that system efficiency is reduced after a certain area segment between users and between products. In view of disadvantage of the single parameter, multi-dimensional parameters including product potential energy and gradient are proposed in the solutions of the disclosure, to reduce system complexity.

(2) The CF algorithm still uses conventional concepts, some optimization is also improved on this basis, while a new concept is not proposed fundamentally. A physical potential energy concept is introduced in the solutions of the disclosure, a product potential concept is proposed, and a gradient is proposed based on this concept to characterize a change trend of product potentials, improving system efficiency.

The embodiments of the disclosure provide a product recommendation method, including the following operations. A target product potential expectation value and a target gradient value of a target user are determined, here, the target product potential expectation value indicates a favorite comprehensive value of the target user to multiple products, and the target gradient value represents a change trend of a favorite degree of the target user to a target product. A similar user set is determined based on the target product potential expectation value and the target gradient value. Multiple gradient values of each user corresponding to multiple to-be-recommended products are acquired from the similar user set, and a similar user gradient value set is formed by the multiple gradient values. At least one recommended gradient value is determined from the similar user gradient value set, and at least one to-be-recommended product corresponding to the at least one recommended gradient value is recommended to the target user. In this way, a change trend of products preferred by the target user may be analyzed by using the target product potential expectation value and the target gradient value, so that the similar user set having a similarity with the target user is acquired, and a recommended product may be provided to the target user according to the similar user set. Furthermore, since the recommended product as provided is obtained according to the change trend of products preferred by the user, the recommended product recommended to the user conforms to the user's preference better and has higher accuracy.

Figure 3:
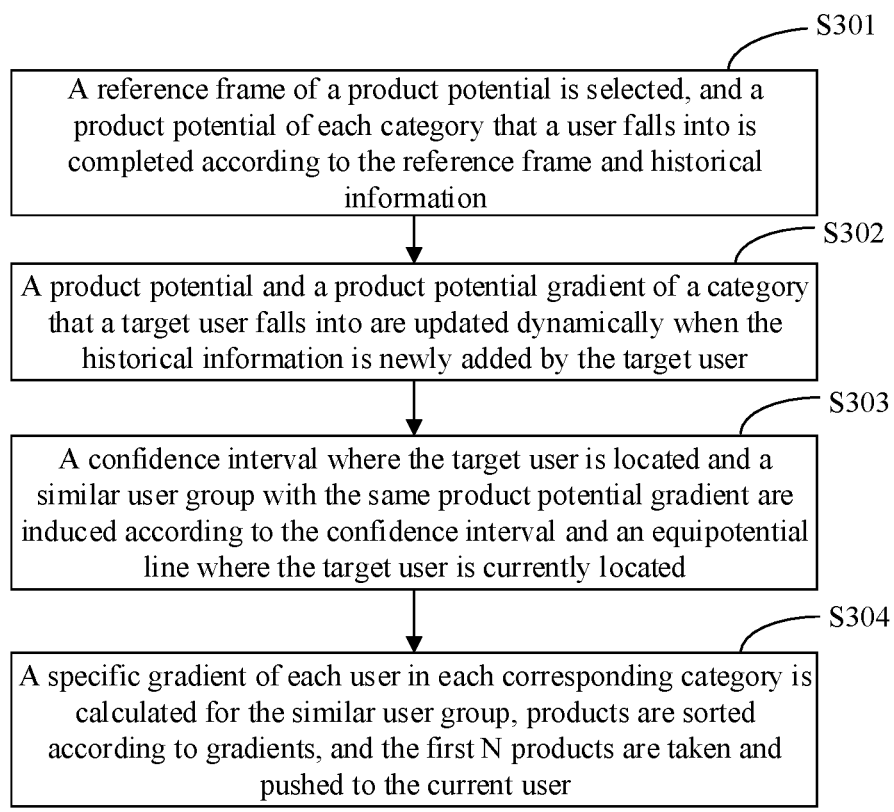
FIG. 3 is a schematic flowchart of yet another product recommendation method according to an embodiment of the disclosure.

In yet another embodiment of the disclosure, with reference to FIG. 3, a schematic flowchart of yet another product recommendation method according to the embodiment of the disclosure is shown. As shown in FIG. 3, the method may include the following operations S301 to S304.

At S301, a reference frame of a product potential is selected, and a product potential of each category that a user falls into is completed according to the reference frame and historical information.

It should be noted that pre-conditions of the embodiment of the disclosure are preliminarily completing simple classification of information, such as men's clothing, women's clothing, data products, computers for office, or the like in an e-commerce website. Furthermore, the product potential is equivalent to the above-mentioned product potential expectation value, and a product potential gradient is equivalent to the foregoing gradient value.

It should be noted that the system uses a new user (without any historical information) as a reference frame of product potentials of all users, and the new user may refer to a specific user in the system, or may refer to a virtual user in the system, as long as the user does not have any historical information; after the reference frame is selected, the product potential of the user will be calculated according to the reference frame, and the calculation formula is shown in formula (3):

$$UP = \sum_{i \in historyData} Item_i * C_i \qquad (3)$$

Here, Item, represents a weight or proportion of a product i in the category, $C_i$ represents a penalty factor of the product i, and historyData represents the historical browsing data of the user.

It should be noted that $C_i$ represents a preference degree of the user, and $$\sum_{i \in historyData} C_i = 1,$$

and $C_i$ is equal to 1/i by default under initial conditions, that is, it represents that the user does not have penalty on the product, and the lower the penalty factor, the less interest the user on the product. As the historical data of the user is updated continuously, the penalty factor of each product also changes dynamically, for example, when a frequency of the user browsing a certain product is greater than that of the user browsing other products, the penalty factor of the product will be increased, and relatively speaking, penalty factors of other products will be reduced correspondingly. It may be known according to formula (3) that the product set (i.e., item) browsed by the new user is empty at this time, and therefore a product potential of the new user is zero.

It should also be noted that the principle for the value of $C_i$ may be determined according to an actual usage scenario. In a feasible manner, the value of $C_i$ may be a ratio of a frequency of a user browsing the product to a frequency of the user browsing all products, as shown in formula (4):

$$C_i = number(i)/sum \qquad (4)$$

Here, number(i) represents a frequency of the user browsing a product i, and sum represents the frequency of the user browsing all products.

At S302, a product potential and a product potential gradient of a category that a target user falls into are updated dynamically when the historical information is newly added by the target user.

After the target user completes initialization of the product potential, when historical data is newly added by the target user, the product potential after the historical data is newly added by the target user is calculated according to formula (1) (dimension of the product potential is calculated in a range of a certain category, to reduce the calculation time), a product potential gradient of a certain product is calculated, and the calculation formula is shown in formula (5):

$$g = \left| \sum_{i \in historyData'} \text{Item}'_i C'_i - \sum_{i \in historyData} \text{Item}_i C_i \right| / (C'_i - C_i) \quad (5)$$

It should be noted that an influence gradient of a specific product on an overall product potential of the user is calculated according to formula (3), at this time, when the frequency of the user browsing the product drops, g is a negative value, it indicates that the target user is not interested in the product; and when the frequency of the user browsing the product rises, g is a positive value, it indicates that the user is interested in the product.

Furthermore, the more severe the user changes a penalty factor of the product, the larger the absolute value of $(C'_i - C_i)$, the smaller the absolute value of g at this time. Therefore, the smaller the absolute value of g value, the greater the influence degree of the product on the product potential (which may be a positive influence degree or a negative influence degree); the greater the absolute value of g value, the smaller the influence degree of the product on the product potential (which may be a positive influence degree or a negative influence degree).

At S303, a confidence interval where the target user is located and a similar user group with the same product potential gradient are induced according to the confidence interval and an equipotential line where the target user is currently located.

It should be noted that the located equipotential line and the confidence interval are determined according to the product potential of the target user in the current category, to determine a product potential range, that is, other users whose product potentials falls within the product potential range are selected. Multiple users having the same product potential gradient as the target user are screened out from the selected users for the second time, and multiple users obtained at this time form the similar user group. As to the similar user group, it may be considered that the group and the target user have the same preference degree to a certain product, therefore it is considered that the similar user group has some similarity with the current user, and products of interest of users in the similar user group may be pushed to the current user as recommended products.

At S304, a specific gradient of each user in each corresponding category is calculated for the similar user group, products are sorted according to gradients, and the first N products are taken and pushed to the current user.

It should be noted that for each user in the similar user group, there may be product potential gradients for products browsed by the user, so that each user corresponds to product potential gradients of multiple products. Multiple products with positive product potential gradients corresponding to each user in the similar user group are screened (i.e., products in which the user's interest rises), and the product potential gradients of multiple products screened by each user in the similar user group are sorted comprehensively, and N products with minimum product potential gradients are taken as recommended products for the target user.

In summary, implementation of the product recommendation method is given in detail in the embodiment of the disclosure, and in order to better present an algorithm idea of the product recommendation method, pseudo codes for implementing the product recommendation method are provided as follows:

```
CFItemPotential
Begin
    initUserItemPotential(historyData)
    If add history data for catagory
        potential = updateUserItemPotential
        gradient = calculateUserItemGradient
    End
    users = findUserInConfidenceInterval(potential, gradient)
    usersItemGradient = calculateConfidenceIntervalUsersItemGradient(users)
    userItems = sort(usersItemGradient)
    return userItems(0..N)
End
```

According to the product recommendation method provided by the embodiment of the disclosure, a change trend of products preferred by the target user may be analyzed by using the target product potential expectation value and the target gradient value, so that the similar user set having a similarity with the target user is acquired, and a recommended product may be provided to the target user according to the similar user set. Furthermore, since the recommended product as provided is obtained according to the change trend of products preferred by the user, the recommended product recommended to the user conforms to the user's preference better and has higher accuracy.

Figure 4:
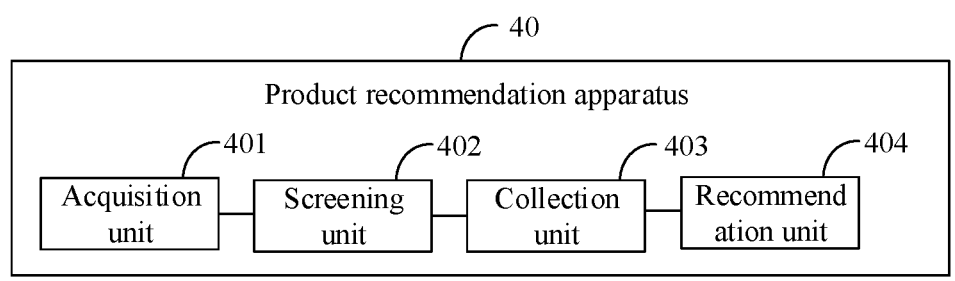
FIG. 4 is a schematic structural diagram of composition of a product recommendation apparatus according to an embodiment of the disclosure.

In yet another embodiment of the disclosure, with reference to FIG. 4, a schematic structural diagram of composition of a product recommendation apparatus 40 according to the embodiment of the disclosure is shown. As shown in FIG. 4, the product recommendation apparatus 40 includes an acquisition unit 401, a screening unit 402, a collection unit 403 and a recommendation unit 404.

The acquisition unit 401 is configured to determine a target product potential expectation value and a target gradient value of a target user, here, the target product potential expectation value indicates a favorite comprehensive value of the target user to multiple products, and the target gradient value represents a change trend of a favorite degree of the target user to a target product.

The screening unit 402 is configured to determine a similar user set based on the target product potential expectation value and the target gradient value.

The collection unit 403 is configured to acquire, from the similar user set, multiple gradient values of each user corresponding to multiple to-be-recommended products, and form a similar user gradient value set by the multiple gradient values.

The recommendation unit 404 is configured to determine at least one recommended gradient value from the similar user gradient value set, and recommend at least one to-be-recommended product corresponding to the at least one recommended gradient value to the target user.

In some embodiments, the acquisition unit 401 is specifically configured to: acquire historical browsing data of the target user after identifying that the target user performs a browsing operation on the target product; determine a browsed product set corresponding to the target user according to the historical browsing data, and acquire a target penalty factor of each product in the browsed product set, here, the browsed product set includes the target product, and the target penalty factor is configured to characterize a favorite degree of a user to a product; calculate the target product potential expectation value based on the target penalty factor of each product in the browsed product set; and obtain the target gradient value based on the target product potential expectation value and a first calculation model.

In some embodiments, the acquisition unit 401 is further configured to: acquire a weight value of each product in the browsed product set; and obtain the target product potential expectation value by a second calculation model according to the weight value of each product in the browsed product set and the target penalty factor of each product in the browsed product set.

In some embodiments, the acquisition unit 401 is further configured to: determine a browsing frequency corresponding to each product in the browsed product set according to the historical browsing data, and determine a total browsing frequency corresponding to the browsed product set; and calculate a ratio of the browsing frequency corresponding to each product to the total browsing frequency, and determine the calculated ratio as the target penalty factor of each product.

In some embodiments, the acquisition unit 401 is further configured to: acquire a pre-browsing product potential expectation value of the target user, and perform a subtraction operation between the target product potential expectation value and the pre-browsing product potential expectation value, to obtain a product potential expectation difference; acquire a pre-browsing penalty factor and a target penalty factor corresponding to the target product, and perform a subtraction operation between the target penalty factor and the pre-browsing penalty factor, to obtain a penalty factor difference; and calculate a ratio of the product potential expectation value to the penalty factor difference, to obtain the target gradient value of the target user.

In some embodiments, the screening unit 402 is specifically configured to: determine a similar product potential expectation range according to the target product potential expectation value and a first preset confidence interval; determine multiple first users based on the similar product potential expectation range, here, product potential expectation values of the first users are within the similar product potential expectation range; determine a similar gradient value range based on the target gradient value and a second preset confidence interval; and determine multiple second users from the multiple first users based on the similar gradient value range, and determine the multiple second users as the similar user set, here, gradient values of the second users for the target product are within the similar gradient value range.

In some embodiments, the recommendation unit 404 is further configured to: sort multiple gradient values in the similar user gradient value set; and determine the at least one recommended gradient value according to a result of the sorting.

It may be understood that in the embodiments, "unit" may be a part of a circuit, a part of a processor, a part of a program or software, or the like, and certainly, "unit" may also be a module, or may be non-modular. Furthermore, components in the embodiments may be integrated into a processing unit, or each unit may exist alone physically, or two or more units may be integrated into a unit. The integrated unit may be implemented in form of hardware, or may be implemented in form of a software function module.

When the integrated unit is implemented in form of the software function module, rather than and sold or used as an independent product, the integrated unit may be stored in a computer-readable storage medium. Based on such understanding, the technical solutions of the embodiments substantially or parts making contributions to the related art, or all or part of the technical solutions may be embodied in form of a software product, and the computer software product is stored in a storage medium, including multiple instructions configured to enable a computer device (which may be a personal computer, a server, a network device, or the like) or a processor to execute all or part of operations of the methods according to the embodiments. The above-mentioned storage medium includes various media capable of storing program codes, such as a USB flash disk, a mobile hard disk, a Read Only Memory (ROM), a Random Access Memory (RAM), a magnetic disk, or an optical disk, or the like.

Therefore, the embodiment provides a computer storage medium, having stored thereon a product recommendation program, and the product recommendation program implements operations of the method according to any one of the above-mentioned embodiments according to the first aspect when the product recommendation program is executed by at least one processor.

Figure 5:
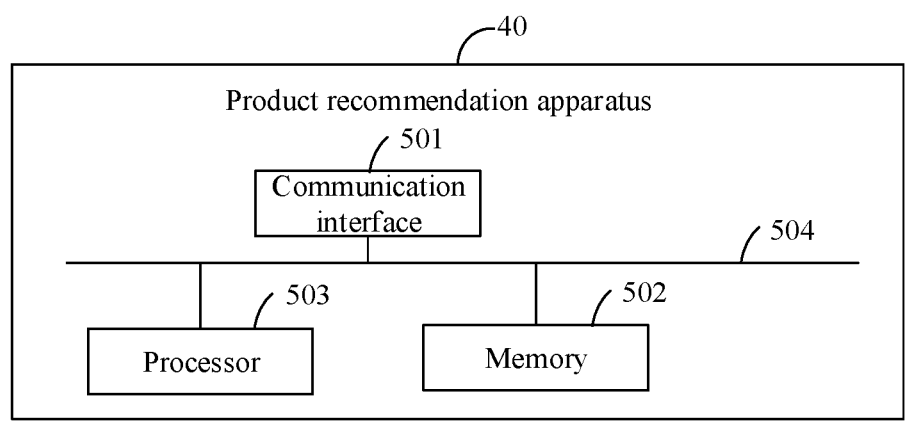
FIG. 5 is a schematic structural diagram of specific hardware of a product recommendation apparatus according to an embodiment of the disclosure.

Based on composition of the product recommendation apparatus 40 and the computer storage medium, with reference to FIG. 5, a structural example of specific hardware of a product recommendation apparatus 40 according to an embodiment of the disclosure is shown. As shown in FIG. 5, the product recommendation apparatus 40 may include a communication interface 501, a memory 502 and a processor 503, and the components are coupled together by a bus device 504. It may be understood that the bus device 504 is configured to implement connection and communication between these components. In addition to including a data bus, the bus device 504 further includes a power bus, a control bus and a state signal bus. However, for clarity of illustration, various buses are marked as the bus device 504 in FIG. 5. The communication interface 501 is configured to receive and transmit signals in a process of receiving and transmitting information from and to other external network elements.

The memory 502 is configured to store a computer program executable on the processor 503.

The processor 503 is configured to when the processor runs the computer program, execute:
  determining a target product potential expectation value and a target gradient value of a target user, here, the target product potential expectation value indicates a favorite comprehensive value of the target user to multiple products, and the target gradient value represents a change trend of a favorite degree of the target user to a target product;
  determining a similar user set based on the target product potential expectation value and the target gradient value;
  acquiring, from the similar user set, multiple gradient values of each user corresponding to multiple to-be-recommended products, and forming a similar user gradient value set by the multiple gradient values; and determining at least one recommended gradient value from the similar user gradient value set, and recommending at least one to-be-recommended product corresponding to the at least one recommended gradient value to the target user.

It may be understood that the memory 502 in the embodiment of the disclosure may be a volatile memory or a non-volatile memory, or may include both the volatile and non-volatile memories. The non-volatile memory may be a ROM, a Programmable ROM (PROM), an Erasable PROM (EPROM), an Electrically EPROM (EEPROM), or a flash memory. The volatile memory may be a RAM used as an external cache. By way of exemplary descriptions rather than restrictive descriptions, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM), a Direct Rambus RAM (DRRAM). The memory 502 of the methods and devices described in the disclosure is intended to include, but is not limited to, memories of these and any other proper types.

The processor 503 may be an integrated circuit (IC) chip with signal processing capability. During implementation, operations of the above methods may be completed by an integrated logic circuit in form of hardware in the processor 503 or instructions in form of software. The processor 503 may be a general-purpose processor, a Digital Signal Processor (DSP), an Application Specific Integrated Circuits (ASIC), a Field Programmable Gate Array (FPGA), or other programmable logical devices, a discrete gate or a transistor logical device, a discrete hardware component. The processor 503 may implement or execute the methods, operations and logical block diagrams disclosed in the embodiments of the disclosure. The general-purpose processor may be a microprocessor, or any conventional processor, or the like. Operations of the methods disclosed in combination with the embodiments of the disclosure may be directly embodied as being executed and completed by a hardware decoding processor, or executed and completed by combination of hardware in the decoding processor and a software module. The software module may be located in a mature storage medium in the art, such as a random memory, a flash memory, a ROM, a PROM or an electrically erasable programmable memory, a register, or the like. The storage medium is located in the memory 502, and the processor 503 reads information in the memory 502 and completes operations of the above methods in combination with hardware of the processor.

It may be understood that these embodiments described in the disclosure may be implemented by hardware, software, firmware, middleware, microcodes, or a combination thereof. In case of implementation by hardware, the processing unit may be implemented in one or more ASICs, DSPs, DSP Devices (DSPDs), Programmable Logic Devices (PLDs), FPGAs, general-purpose processors, controllers, microcontrollers, microprocessors, other electronic units configured to perform functions described in the disclosure, or a combination thereof.

In case of implementation by software, technologies described in the disclosure may be implemented by modules (such as processes, functions, or the like) performing the functions described in the disclosure. Codes of the software may be stored in the memory and executed by the processor. The memory may be implemented in the processor or outside the processor.

Optionally, as another embodiment, the processor 503 is further configured to execute operations of the method according to any one of the above-mentioned embodiments when the processor runs the computer program.

Figure 6:
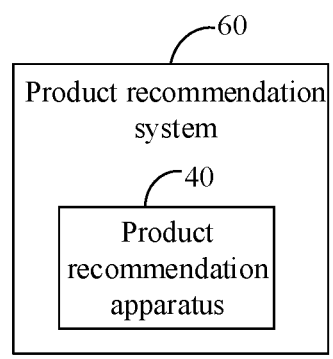
FIG. 6 is a schematic structural diagram of composition of a product recommendation system according to an embodiment of the disclosure.

Based on schematic diagrams of composition and hardware structures of the product recommendation apparatus 40, with reference to FIG. 6, a schematic structural diagram of composition of a product recommendation system 60 according to an embodiment of the disclosure is shown. As shown in FIG. 6, a change trend of products preferred by the target user may be analyzed by using the target product potential expectation value and the target gradient value, so that the similar user set having a similarity with the target user is acquired, and a recommended product may be provided to the target user according to the similar user set. Furthermore, since the recommended product as provided is obtained according to the change trend of products preferred by the user, the recommended product recommended to the user conforms to the user's preference better and has higher accuracy.

The foregoing are only preferred embodiments of the disclosure, and are not intended to limit the scope of protection of the disclosure.

It should be noted that in the disclosure, terms "include", "contain" or any other variants thereof are intended to cover non-exclusive inclusion, so that a process, method, article or device including a series of elements not only includes those elements, but also includes other elements which are not explicitly listed, or elements inherent to such process, method, article or device. In the absence of more limitations, an element defined by a statement "includes a" does not exclude presence of other same elements in the process, method, article or device including the element.

Serial numbers of the embodiments of the disclosure are merely for description, and do not represent advantages and disadvantages of the embodiments.

Methods disclosed in several method embodiments of the disclosure may be arbitrarily combined without conflict, to obtain a new method embodiment.

Features disclosed in several product embodiments of the disclosure may be arbitrarily combined without conflict, to obtain a new product embodiment.

Features disclosed in several method or device embodiments of the disclosure may be arbitrarily combined without conflict, to obtain a new method or device embodiment.

The foregoing are merely specific implementations of the disclosure, however, the scope of protection of the disclosure is not limited thereto. Any variation or replacement apparent to those skilled in the art within the technical scope disclosed by the disclosure shall fall within the scope of protection of the disclosure. Therefore, the scope of protection of the disclosure shall be subjected to the scope of protection of the claims.

INDUSTRIAL APPLICABILITY

In the embodiments of the disclosure, the product recommendation method includes the following operations. A target product potential expectation value and a target gradient value of a target user are determined. A similar user set is determined based on the target product potential expectation value and the target gradient value. Multiple gradient values of each user corresponding to multiple to-be-recommended products are acquired from the similar user set, and a similar user gradient value set is formed by the multiple gradient values. At least one recommended gradient value is determined from the similar user gradient value set, and at least one to-be-recommended product corresponding to the at least one recommended gradient value is recommended to the target user. In this way, a change trend of products preferred by the target user may be analyzed by using the target product potential expectation value and the target gradient value, so that the similar user set having a similarity with the target user is acquired, and a recommended product may be provided to the target user more accurately according to the similar user set.

The invention claimed is:

1. A product recommendation method, applied on a server comprising a processor, and the product recommendation method comprising:
  determining, by the processor, a target product potential expectation value and a target gradient value of a target user, wherein the target product potential expectation value indicates a favorite comprehensive value of the target user to a plurality of products, and the target gradient value represents a change trend of a favorite degree of the target user to a target product; wherein the target product potential expectation value is obtained by a second calculation model according to a weight value of each of the plurality of products and a target penalty factor of each of the plurality of products; the second calculation model is represented as $$UP = \sum_{i \in R} \text{Item}_i * C_i,$$

where UP is the target product potential expectation value, $\text{Item}_i$ represents a weight or proportion of a product i in a category, $C_i$ represents a target penalty factor of the product i, and $$\sum_{i \in R} C_i = 1,$$

and R represents the plurality of products; the target gradient value is calculated by a formula as follows: the target gradient value=(a change amount of the target product potential expectation value)/(a change amount of the favorite degree of the target product); the favorite degree of the target product is a target penalty factor of the target product, and the target penalty factor of the target product is calculated according to a browsing frequency corresponding to the target product;
  determining, by the processor, a similar user set based on the target product potential expectation value and the target gradient value;
  acquiring, by the processor, from the similar user set, a plurality of gradient values of each user corresponding to a plurality of to-be-recommended products, and forming a similar user gradient value set by the plurality of gradient values; and
  determining, by the processor, at least one recommended gradient value from the similar user gradient value set, and transmitting, by a communication interface, information of at least one to-be-recommended product corresponding to the at least one recommended gradient value to a client of the target user for display.

2. The product recommendation method of claim 1, wherein determining, by the processor, the target product potential expectation value and the target gradient value of the target user comprises:
  acquiring, by the processor, historical browsing data of the target user after identifying that the target user performs a browsing operation on the target product;
  determining, by the processor, a browsed product set corresponding to the target user according to the historical browsing data, and acquiring a target penalty factor of each product in the browsed product set, wherein the browsed product set comprises the target product and is composed by the plurality of products;
  calculating, by the processor, the target product potential expectation value based on the target penalty factor of each product in the browsed product set; and
  obtaining, by the processor, the target gradient value based on the target product potential expectation value and a first calculation model.

3. The product recommendation method of claim 2, wherein acquiring, by the processor, the target penalty factor of each product in the browsed product set comprises:
  determining, by the processor, a browsing frequency corresponding to each product in the browsed product set according to the historical browsing data, and determining a total browsing frequency corresponding to the browsed product set; and
  calculating, by the processor, a ratio of the browsing frequency corresponding to each product to the total browsing frequency, and determining the calculated ratio as the target penalty factor of each product.

4. The product recommendation method of claim 2, wherein obtaining, by the processor, the target gradient value based on the target product potential expectation value and the first calculation model comprises:
  acquiring, by the processor, a pre-browsing product potential expectation value of the target user, and performing a subtraction operation between the target product potential expectation value and the pre-browsing product potential expectation value, to obtain a product potential expectation difference;
  acquiring, by the processor, a pre-browsing penalty factor and the target penalty factor of the target product, and performing a second subtraction operation between the target penalty factor and the pre-browsing penalty factor, to obtain a penalty factor difference; and
  calculating, by the processor, a ratio of the product potential expectation difference to the penalty factor difference, to obtain the target gradient value of the target user.

5. The product recommendation method of claim 1, wherein determining, by the processor, the similar user set based on the target product potential expectation value and the target gradient value comprises:
  determining, by the processor, a similar product potential expectation range according to the target product potential expectation value and a first preset confidence interval;
  determining, by the processor, a plurality of first users based on the similar product potential expectation range, wherein product potential expectation values of the plurality of first users are within the similar product potential expectation range;
  determining, by the processor, a similar gradient value range based on the target gradient value and a second preset confidence interval; and
  determining, by the processor, a plurality of second users from the plurality of first users based on the similar gradient value range, and determining the plurality of second users as the similar user set, wherein gradient values of the plurality of second users for the target product are within the similar gradient value range.

6. The product recommendation method of claim 1 wherein determining, by the processor, the at least one recommended gradient value from the similar user gradient value set comprises:
   sorting, by the processor, a plurality of gradient values in the similar user gradient value set in order of values of the plurality of gradient values; and
   determining, by the processor, the at least one recommended gradient value according to a result of the sorting.

7. A product recommendation apparatus, applied on a server and comprising a memory and a processor,
   wherein the memory is configured to store a computer program executable by the processor, and
   the processor is configured to:
   determine a target product potential expectation value and a target gradient value of a target user, wherein the target product potential expectation value indicates a favorite comprehensive value of the target user to a plurality of products, and the target gradient value represents a change trend of a favorite degree of the target user to a target product; wherein the target product potential expectation value is obtained by a second calculation model according to a weight value of each of the plurality of products and a target penalty factor of each of the plurality of products; the second calculation model is represented as $$UP = \sum_{i \in R} \text{Item}_i * C_i,$$

where UP is the target product potential expectation value, $\text{Item}_i$ represents a weight or proportion of a product i in a category, $C_i$ represents a target penalty factor of the product i, and $$\sum_{i \in R} C_i = 1,$$

and R represents the plurality of products; the target gradient value is calculated by a formula as follows: the target gradient value=(a change amount of the target product potential expectation value)/(a change amount of the favorite degree of the target product); the favorite degree of the target product is a target penalty factor of the target product, and the target penalty factor of the target product is calculated according to a browsing frequency corresponding to the target product;
   determine a similar user set based on the target product potential expectation value and the target gradient value;
   acquire, from the similar user set, a plurality of gradient values of each user corresponding to a plurality of to-be-recommended products, and form a similar user gradient value set by the plurality of gradient values; and
   determine at least one recommended gradient value from the similar user gradient value set, and transmit, by a communication interface, information of at least one to-be-recommended product corresponding to the at least one recommended gradient value to a client of the target user for display.

8. The product recommendation apparatus of claim 7, wherein in determining the target product potential expectation value and the target gradient value of the target user, the processor is configured to:
   acquire historical browsing data of the target user after identifying that the target user performs a browsing operation on the target product;
   determine a browsed product set corresponding to the target user according to the historical browsing data, and acquire a target penalty factor of each product in the browsed product set, wherein the browsed product set comprises the target product and is composed by the plurality of products;
   calculate the target product potential expectation value based on the target penalty factor of each product in the browsed product set; and
   obtain the target gradient value based on the target product potential expectation value and a first calculation model.

9. The product recommendation apparatus of claim 8, wherein in acquiring the target penalty factor of each product in the browsed product set, the processor is configured to:
   determine a browsing frequency corresponding to each product in the browsed product set according to the historical browsing data, and determine a total browsing frequency corresponding to the browsed product set; and
   calculate a ratio of the browsing frequency corresponding to each product to the total browsing frequency, and determine the calculated ratio as the target penalty factor of each product.

10. The product recommendation apparatus of claim 8, wherein in obtaining the target gradient value based on the target product potential expectation value and the first calculation model, the processor is configured to:
   acquire a pre-browsing product potential expectation value of the target user, and perform a subtraction operation between the target product potential expectation value and the pre-browsing product potential expectation value, to obtain a product potential expectation difference;
   acquire a pre-browsing penalty factor and the target penalty factor of the target product, and perform a second subtraction operation between the target penalty factor and the pre-browsing penalty factor, to obtain a penalty factor difference; and
   calculate a ratio of the product potential expectation difference to the penalty factor difference, to obtain the target gradient value of the target user.

11. The product recommendation apparatus of claim 7, wherein in determining the similar user set based on the target product potential expectation value and the target gradient value, the processor is configured to:
   determine a similar product potential expectation range according to the target product potential expectation value and a first preset confidence interval;
   determine a plurality of first users based on the similar product potential expectation range, wherein product potential expectation values of the plurality of first users are within the similar product potential expectation range;
   determine a similar gradient value range based on the target gradient value and a second preset confidence interval; and
   determine a plurality of second users from the plurality of first users based on the similar gradient value range, and determine the plurality of second users as the similar user set, wherein gradient values of the plurality of second users for the target product are within the similar gradient value range.

12. The product recommendation apparatus of claim 7, wherein in determining the at least one recommended gradient value from the similar user gradient value set, the processor is configured to:
sort a plurality of gradient values in the similar user gradient value set in order of values of the plurality of gradient values; and
determine the at least one recommended gradient value according to a result of the sorting.

13. A non-transitory computer storage medium, having stored thereon a product recommendation program, wherein the product recommendation program, when executed by at least one processor, implements steps of a product recommendation method, comprising:
determining a target product potential expectation value and a target gradient value of a target user, wherein the target product potential expectation value indicates a favorite comprehensive value of the target user to a plurality of products, and the target gradient value represents a change trend of a favorite degree of the target user to a target product; wherein the target product potential expectation value is obtained by a second calculation model according to a weight value of each of the plurality of products and a target penalty factor of each of the plurality of products; the second calculation model is represented as $$UP = \sum_{i \in R} \text{Item}_i * C_i,$$

where UP is the target product potential expectation value, $\text{Item}_i$ represents a weight or proportion of a product i in a category, $C_i$ represents a target penalty factor of the product i, and $$\sum_{i \in R} C_i = 1,$$

and R represents the plurality of products; the target gradient value is calculated by a formula as follows: the target gradient value=(a change amount of the target product potential expectation value)/(a change amount of the favorite degree of the target product); the favorite degree of the target product is a target penalty factor of the target product, and the target penalty factor of the target product is calculated according to a browsing frequency corresponding to the target product;
determining a similar user set based on the target product potential expectation value and the target gradient value;
acquiring, from the similar user set, a plurality of gradient values of each user corresponding to a plurality of to-be-recommended products, and forming a similar user gradient value set by the plurality of gradient values; and
determining at least one recommended gradient value from the similar user gradient value set, and transmitting, by a communication interface, information of at least one to-be-recommended product corresponding to the at least one recommended gradient value to a client of the target user for display.

14. The non-transitory computer storage medium of claim 13, wherein determining the target product potential expectation value and the target gradient value of the target user comprises:
acquiring historical browsing data of the target user after identifying that the target user performs a browsing operation on the target product;
determining a browsed product set corresponding to the target user according to the historical browsing data, and acquiring a target penalty factor of each product in the browsed product set, wherein the browsed product set comprises the target product and is composed by the plurality of products;
calculating the target product potential expectation value based on the target penalty factor of each product in the browsed product set; and
obtaining the target gradient value based on the target product potential expectation value and a first calculation model.

15. The non-transitory computer storage medium of claim 14, wherein acquiring the target penalty factor of each product in the browsed product set comprises:
determining a browsing frequency corresponding to each product in the browsed product set according to the historical browsing data, and determining a total browsing frequency corresponding to the browsed product set; and
calculating a ratio of the browsing frequency corresponding to each product to the total browsing frequency, and determining the calculated ratio as the target penalty factor of each product.

16. The non-transitory computer storage medium of claim 14, wherein obtaining the target gradient value based on the target product potential expectation value and the first calculation model comprises:
acquiring a pre-browsing product potential expectation value of the target user, and performing a subtraction operation between the target product potential expectation value and the pre-browsing product potential expectation value, to obtain a product potential expectation difference;
acquiring a pre-browsing penalty factor and the target penalty factor of the target product, and performing a second subtraction operation between the target penalty factor and the pre-browsing penalty factor, to obtain a penalty factor difference; and
calculating a ratio of the product potential expectation difference to the penalty factor difference, to obtain the target gradient value of the target user.

17. The non-transitory computer storage medium of claim 14, wherein determining the similar user set based on the target product potential expectation value and the target gradient value comprises:
determining a similar product potential expectation range according to the target product potential expectation value and a first preset confidence interval;
determining a plurality of first users based on the similar product potential expectation range, wherein product potential expectation values of the plurality of first users are within the similar product potential expectation range;
determining a similar gradient value range based on the target gradient value and a second preset confidence interval; and determining a plurality of second users from the plurality of first users based on the similar gradient value range, and determining the plurality of second users as the similar user set, wherein gradient values of the plurality of second users for the target product are within the similar gradient value range.

\* \* \* \* \*